May 3, 1938.　　　　　E. RIETSCH　　　　　2,116,413
SHIELD
Filed Aug. 5, 1935
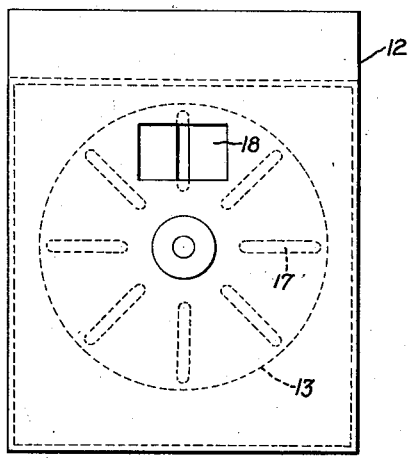
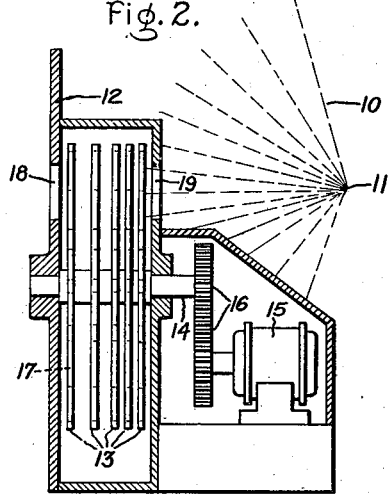
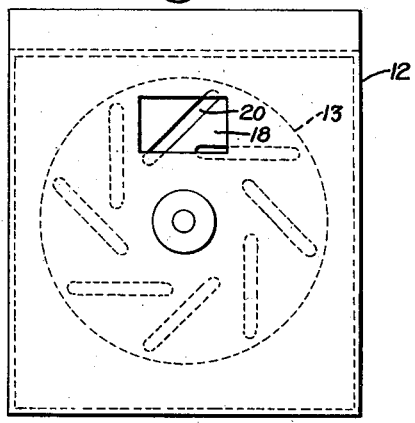
Inventor:
Eberhard Rietsch,
by Harry E. Dunham
His Attorney.

Patented May 3, 1938

2,116,413

UNITED STATES PATENT OFFICE 2,116,413

SHIELD

Eberhard Rietsch, Hennigsdorf, Germany, assignor to General Electric Company, a corporation of New York Application August 5, 1935, Serial No. 34,849
In Germany August 13, 1934

2 Claims. (Cl. 91—18)

In the observation of processes which take place with the spreading or spraying of liquid or solid particles, as for example in welding or casting, it is usual to protect the observer from the action of these particles by suitable shields. As a rule, such protecting devices are provided, as far as vision is concerned, with colored glass plates or the like. Such shields are unsatisfactory because in use they not only lose their transparency and thus render observation difficult, but also, due to the fact that the glass plates frequently crack or burst while being used, the operator making the observation with such a shield is endangered.

It is an object of my invention to provide a shield for use in observing operations which take place with the spreading or spraying of liquid or solid particles whose instantaneous velocities for the most part vary widely within a short space of travel. With such a shield the eye directly follows the process on the object without being subject to injury from flying particles and the observer is assured the maximum safety.

A further object of my invention is to provide such a device in which a plurality of spaced stroboscopic discs having registering openings therein are rotated between the observer and the object observed, the spacing between said discs and their speed of movement being so related to the size of the openings in said discs that the passage of flying particles through said shield is prohibited.

Further objects of my invention will become apparent from a consideration of the following description of the embodiments illustrated in the accompanying drawing.

In the drawing, Figs. 1 and 2 are front and side sectional views of one embodiment of my invention and Fig. 3 is a front view illustrating a modification of the embodiment illustrated in Figs. 1 and 2.

The embodiment illustrated in Figs. 1 and 2 is a particularly advantageous arrangement, the utility of which has been proved by tests. In Fig. 2, the broken lines 10 indicate the lines of flight of solid or liquid particles from the object 11 which is being viewed by an observer who takes his position on the other side of the shield 12. This shield comprises five stroboscopic discs 13 mounted one behind the other on a spindle 14 which is rotated by a motor 15 connected thereto through a gear drive 16. The discs 13 and driving mechanism therefor are, in the arrangement illustrated, enclosed within chambers forming part of the shield. The discs 13 are provided with radially disposed slots 17 of like configuration which are in register with one another. These discs are so supported that their openings are movable between observation openings 18 and 19 located in opposite walls of the chamber within which the discs are enclosed. These observation openings may be as illustrated of greater width than the slots thereby increasing the field of vision. The spacing between the discs, the size of the openings in the disc, and the speed at which the discs are rotated are all so correlated that the passage of flying particles from the object 11 through the shield is prohibited. In other words, the spacing between the discs is such that flying particles which pass through a slot of the first disc nearest to the object and which have velocities having such a relation to the velocities of the discs and the openings therein that they fly through a slot of the second or even of the third disc, eventually meet with a solid surface on the fourth or fifth disc. With five discs it has been shown by experience that there is practically no possibility of flying particles passing through all the discs to the observer located on the other side of the shield of which these discs form a part.

It is to be understood, however, that the invention is not limited to the use of five discs since a smaller or greater number of discs may be employed with safety, depending upon circumstances. It is apparent that the discs may be equally or unequally spaced from one another without departing from my invention. An unequal spacing of the discs is advantageous in stopping particles whose velocities are such as to permit their passage through non-registering openings in adjacent discs. If the velocity of a particle is such as to permit its passage through two non-registering openings in two adjacent discs, the unequal spacing of a third disc will prohibit further passage of the particle because the particle's time of travel from disc to disc has been changed by the unequal spacing of the discs. It is also apparent that the parts need not be enclosed, as illustrated in Figs. 1 and 2, but it is desirable to do this to protect the apparatus from flying particles.

It is also apparent that the efficacy of the shield in part results from the relative movement of two members having openings which are periodically moved across one another, for example, a disc and a stationary member such as a side wall of the chamber enclosing the disc, provided the spacing of these members and their speed of movement are properly related to the size of the openings therein.

The size and shape of the slots in the discs may be widely varied without departing from my invention. The radially disposed slots may be located as illustrated in the embodiment shown in Fig. 3 where the slots 20 are offset radially, that is do not extend along a radius.

For use in welding operations, the parts of the shield are advantageously made of some opaque material in order to protect the eyes of the operator from the glare of the arc and the intense light resulting from the welding operation. It is of course apparent that for many applications the choice of material has no significance with respect to the utility of the shield.

The observation opening 18 may be closed by glass or similar transparent material. When such a construction is used, it is apparent that the rotating discs will prevent particles impinging thereon and thus destroying their transparency. It is also apparent that the closing glass or similar transparent material will be so protected that there will be no possibility of its cracking or bursting by reason of the impinging of particles thereon. When such a construction is used for observing welding operations, the glass, or other transparent material, may be colored in order to decrease the intensity of the light transmitted therethrough, but generally this will not be necessary because the rotating discs adequately decrease the intensity of the transmited light.

Shields according to my invention may be supported in a fixed or in an adjustable position relative to the apparatus or object with which it is to be used. The manner of support has not been illustrated in the drawing since this is a matter of choice and will depend upon the circumstances of the use to which the shield is placed.

What I claim as new and desire to secure by Letters Patent of the United States is:

1. A shield for use in observing operations which take place with the spreading or spraying of liquid or solid particles which comprises a spindle, more than two unequally spaced parallel discs having registering openings therein supported on said spindle with said openings in register with one another, and means for rotating said spindle.

2. A shield for use in observing operations which take place with the spreading or spraying of liquid or solid particles which comprises a spindle, more than two parallel discs having registering slots therein supported on said spindle with said slots in register with one another, and a stationary member supported between said discs and the source of said liquid or solid particles with the registering slots of said discs movable across an observation opening in said member, said observation opening being of greater width than said slots.

EBERHARD RIETSCH.